(12) United States Patent
Yu

(10) Patent No.: US 6,942,724 B2
(45) Date of Patent: Sep. 13, 2005

(54) MODIFIED ORGANIC COLORANTS AND DISPERSIONS, AND METHODS FOR THEIR PREPARATION

(75) Inventor: Yuan Yu, Nashua, NH (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/414,589

(22) Filed: Apr. 16, 2003

(65) Prior Publication Data

US 2004/0206269 A1 Oct. 21, 2004

(51) Int. Cl.⁷ .................. C09B 67/04; C09B 67/10; C09D 11/00

(52) U.S. Cl. .............. 106/493; 106/410; 106/412; 106/494; 106/495; 106/496; 106/497; 106/498; 106/499; 106/31.6

(58) Field of Search .................. 106/412, 493, 106/494, 495, 496, 497, 498, 499, 31.6, 410

(56) References Cited

U.S. PATENT DOCUMENTS

| | | | |
|---|---|---|---|
| 3,479,300 A | 11/1969 | Rivin et al. ................. 252/430 |
| 4,014,844 A | 3/1977 | Vidal et al. ............ 260/31.2 R |
| 4,264,488 A | 4/1981 | Guenthert et al. ........ 260/42.21 |
| 4,946,509 A | 8/1990 | Schwartz et al. ........... 106/496 |
| 5,281,261 A | 1/1994 | Lin ........................... 106/20 R |
| 5,418,277 A | 5/1995 | Ma et al. .................... 524/520 |
| 5,545,504 A | 8/1996 | Keoshkerian et al. ....... 430/137 |
| 5,554,739 A | 9/1996 | Belmont ..................... 534/885 |
| 5,571,311 A | 11/1996 | Belmont ................... 106/20 R |
| 5,630,868 A | 5/1997 | Belmont et al. ......... 106/31.75 |
| 5,672,198 A | 9/1997 | Belmont ................... 106/20 R |
| 5,698,016 A | 12/1997 | Adams et al. .............. 106/316 |
| 5,707,432 A | 1/1998 | Adams et al. ............. 106/31.6 |
| 5,713,988 A | 2/1998 | Belmont et al. .......... 106/31.6 |
| 5,714,993 A | 2/1998 | Keoshkerian et al. ......... 347/95 |
| 5,803,959 A | 9/1998 | Johnson et al. .......... 106/31.75 |
| 5,837,045 A | 11/1998 | Johnson et al. .......... 106/31.85 |
| 5,851,280 A * | 12/1998 | Belmont et al. ............ 106/472 |
| 5,885,335 A | 3/1999 | Adams et al. .............. 106/316 |
| 5,895,522 A | 4/1999 | Belmont et al. .......... 106/31.6 |
| 5,900,029 A | 5/1999 | Belmont et al. ............... 8/550 |
| 5,914,806 A | 6/1999 | Gordon II et al. .......... 359/296 |
| 5,922,118 A | 7/1999 | Johnson et al. ............ 106/31.6 |
| 5,952,429 A | 9/1999 | Ikeda et al. ............... 525/326.1 |
| 5,964,935 A | 10/1999 | Chen et al. ................. 106/401 |
| 5,968,243 A | 10/1999 | Belmont et al. ......... 106/31.65 |
| 5,976,233 A | 11/1999 | Osumi et al. ............ 106/31.75 |
| 6,042,643 A | 3/2000 | Belmont et al. ............ 106/472 |
| 6,068,688 A | 5/2000 | Whitehouse et al. ..... 106/31.65 |
| 6,103,380 A | 8/2000 | Devonport ................. 428/403 |
| 6,110,994 A | 8/2000 | Cooke et al. ............... 523/215 |
| 6,136,087 A * | 10/2000 | Kapoor ....................... 106/496 |
| 6,150,433 A | 11/2000 | Tsang et al. ................ 523/160 |
| 6,221,143 B1 | 4/2001 | Palumbo .................... 106/31.6 |
| 6,221,932 B1 | 4/2001 | Moffatt et al. .............. 523/160 |
| 6,235,829 B1 | 5/2001 | Kwan ......................... 524/495 |
| 6,281,267 B2 | 8/2001 | Parazak ...................... 523/160 |
| 6,328,894 B1 | 12/2001 | Chan et al. ................. 210/638 |
| 6,336,965 B1 | 1/2002 | Johnson et al. ............ 106/31.6 |
| 6,350,519 B1 | 2/2002 | Devonport ................. 428/403 |
| 6,372,820 B1 | 4/2002 | Devonport ................. 523/215 |
| 6,398,858 B1 * | 6/2002 | Yu et al. ................... 106/31.64 |
| 6,402,825 B1 | 6/2002 | Sun ............................ 106/473 |
| 6,432,194 B2 | 8/2002 | Johnson et al. ............ 106/499 |
| 6,451,103 B1 * | 9/2002 | Uemura et al. ............. 106/493 |
| 6,458,458 B1 | 10/2002 | Cooke et al. ............... 428/407 |
| 6,472,471 B2 | 10/2002 | Cooke et al. ............... 525/165 |
| 6,478,863 B2 | 11/2002 | Johnson et al. ............ 106/31.6 |
| 6,494,943 B1 | 12/2002 | Yu et al. .................... 106/31.65 |
| 6,494,946 B1 | 12/2002 | Belmont et al. ............ 106/472 |
| 6,506,245 B1 | 1/2003 | Kinney et al. .............. 106/493 |
| 6,602,335 B2 | 8/2003 | Moffatt et al. ............. 106/31.8 |
| 6,641,653 B2 | 11/2003 | Yu ............................. 106/31.6 |
| 6,641,656 B2 | 11/2003 | Yu et al. ..................... 106/493 |
| 6,648,954 B2 | 11/2003 | Uemura et al. .......... 106/31.85 |

(Continued)

FOREIGN PATENT DOCUMENTS

| | | | |
|---|---|---|---|
| EP | 0 677 556 A2 | 10/1995 | .......... C09B/67/08 |
| EP | 0 688 836 A2 | 12/1995 | .......... C09D/11/02 |
| EP | 0 839 883 A2 | 5/1998 | .......... C09D/11/00 |
| EP | 1 146 094 | 10/2001 | .......... C09D/11/00 |
| GB | 1 168 523 | 10/1969 | .......... C09B/67/00 |
| GB | 2 330 842 | 5/1999 | .......... C09B/67/54 |
| GB | 2356634 A * | 5/2001 | |
| GB | 2356866 A * | 6/2001 | |
| GB | 2364322 A * | 1/2002 | |
| JP | 6-128517 | 5/1994 | .......... C09D/11/02 |
| WO | WO00/26304 | 5/2000 | .......... C09B/67/22 |
| WO | WO01/25340 | 4/2001 | .......... C09B/67/20 |
| WO | WO02/94944 | 11/2002 | .......... C09B/67/00 |
| WO | WO03/08510 | 1/2003 | .......... C09D/17/00 |

OTHER PUBLICATIONS

International Search Report and Written Opinion for PCT/US2004/010579, mailed Sep. 2, 2004.
JP11246806 A to Toyo Ink Mfg. Co. Ltd. Publication Date Sep. 14, 1999 Abstract Only (from Patent Abstracts of Japan).
JP11080636 A to Canon Inc., Publication Date Mar. 26, 1999 Abstract Only (from Patent Abstracts of Japan).
JP11256066 A to Tokai Carbon Co. Ltd., Publication Date Sep. 21, 1999 Abstract Only (from Patent Abstracts of Japan).

*Primary Examiner*—Anthony J. Green

(57) ABSTRACT

The present invention relates to methods of preparing modified organic colorant dispersions comprising the step of combining, in any order, i) an organic colorant; ii) an hydroxide reagent; and iii) an aqueous medium, to form a modified organic colorant dispersion. The methods further comprises a particle size reduction step. These steps can occur in either order. The organic colorant comprises at least one organic species having at least one carboxylic acid group. Modified organic colorants and uses of these modified organic colorants, including inkjet ink compositions, are also disclosed.

45 Claims, 3 Drawing Sheets

U.S. PATENT DOCUMENTS

| | | | |
|---|---|---|---|
| 6,664,312 B2 | 12/2003 | Devonport | 523/205 |
| 6,699,319 B2 * | 3/2004 | Adams et al. | 106/476 |
| 6,723,783 B2 | 4/2004 | Palumbo et al. | 524/555 |
| 6,740,151 B2 | 5/2004 | Belmont et al. | 106/31.6 |
| 2001/0003263 A1 | 6/2001 | Johnson et al. | 106/413 |
| 2001/0036994 A1 | 11/2001 | Bergemann et al. | 524/495 |
| 2002/0005146 A1 * | 1/2002 | Palumbo et al. | 106/476 |
| 2002/0147252 A1 | 10/2002 | Adams | 523/161 |
| 2003/0195291 A1 | 10/2003 | Lamprey et al. | 524/495 |
| 2003/0213410 A1 | 11/2003 | Adams et al. | 106/499 |
| 2003/0217672 A1 | 11/2003 | Palumbo | 106/473 |
| 2004/0007152 A1 | 1/2004 | Palumbo | 106/31.6 |
| 2004/0007161 A1 | 1/2004 | Belmont et al. | 106/499 |
| 2004/0103822 A1 | 6/2004 | Champlin et al. | 106/473 |
| 2004/0163569 A1 | 8/2004 | Shakhnovich | 106/31.8 |
| 2004/0206275 A1 | 10/2004 | Shakhnovich | 106/412 |

* cited by examiner

MODIFIED ORGANIC COLORANTS AND DISPERSIONS, AND METHODS FOR THEIR PREPARATION

BACKGROUND OF THE INVENTION

1. Field of the Invention

The present invention relates to methods of preparing modified organic colorants and dispersions thereof. Modified organic colorants and uses of these colorants, including inkjet ink compositions, are also disclosed.

2. Description of the Related Art

In general, pigments alone are not readily dispersible in liquid vehicles. A variety of techniques have been developed which can provide stable pigment dispersions. For example, dispersants can be added to the pigment to improve its dispersibility in a particular medium. Examples of dispersants for an aqueous medium include water-soluble polymers and surfactants. In addition, water soluble pigment derivatives substituted with an acidic functional group or salt, such as those described in U.S. Pat. No. 6,451,103, have also been used to prepare aqueous dispersions of pigments.

Colored pigment dispersions have been prepared using dispersants having a structural unit similar if not identical to the chemical unit of the colored pigment. For example, GB2356866 discloses a bis-azo compound derived from diazotized (carboxy/sulfo)-anilines and 1,4-bis (acetoacetamido)phenylenes and their use in pigment and ink compositions. These materials were found to be particularly useful in combination with yellow or orange pigments having nearly the identical structure. GB2356634 describes very similar mono-azo compounds for the same use. GB2364322 describes N-(sulfophenyl)-alpha-(2-methoxy-4-nitrophenylazo) acetacetamides for use with monoazo pigments, particularly yellow pigments.

Other methods of controlling the dispersibility of colored pigments are also known. For example, International Patent Application No. WO00/26304 discloses the preparation of a crystal growth inhibitor that controls the amount of crystallinity developed during the process of preparing a colored pigment and prevents recrystallization of dispersed pigments. The crystal growth inhibitor is prepared using a process similar to the known process for preparing the pigment (for example, by the reaction of a diazonium salt with an azo coupling agent), and can also be prepared in situ during the preparation of the colored pigment.

Modified colored pigments have also been developed which provide ink compositions with improved properties, such as dispersibility. For example, U.S. Pat. No. 5,851,280 discloses methods for the attachment of organic groups onto pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like.

PCT International Publication No. WO 01/51566 describes a method of making a modified pigment by reacting a first chemical group and a second chemical group to form a pigment having attached a third chemical group. The first chemical group includes at least one nucleophile and the second chemical group includes at least one electrophile, or vice versa. These pigments are used in ink compositions and, in particular, inkjet ink compositions.

While these efforts provide modified pigments with desirable overall properties, there remains a need for improved modified organic colorants and dispersions, as well as improved methods for preparing modified organic colorants, in order to meet the ever demanding needs of the colorant markets.

SUMMARY OF THE INVENTION

The present invention relates to a method of preparing a modified organic colorant dispersion comprising the steps of: combining, in any order, i) an organic colorant, ii) an hydroxide reagent, and iii) an aqueous medium, to form a modified organic colorant dispersion; and reducing the particle size of the modified organic colorant in the dispersion to a particle size of less than or equal to 500 nm. The organic colorant comprises at least one organic species having at least one carboxylic acid group. These steps can occur in any order. Therefore, in another embodiment, the present invention relates to a method of preparing a modified organic colorant dispersion comprising the step of reducing the particle size of an organic colorant as described above to a particle size of less than or equal to 500 nm; and combining such size-reduced organic colorant, in any order, with i) an hydroxide reagent and ii) an aqueous medium, to form a modified organic colorant dispersion.

The present invention further relates to a modified organic colorant comprising the reaction product of a) an organic colorant comprising at least one organic species having at least one carboxylic acid group and b) an hydroxide reagent. The modified organic colorant may comprises i) at least one organic species having at least one salt of a carboxylic acid group and ii) at least one organic species having at least one carboxylic acid group. In one embodiment, in which the organic colorant comprises at least one organic species having one carboxylic acid group, the modified organic colorant comprises at least one organic species having one salt of a carboxylic acid group. For this embodiment, the modified organic colorant may further comprise at least one organic species having one carboxylic acid group. In another embodiment, in which the organic colorant comprises at least one organic species having at least two carboxylic acid groups, the modified organic colorant comprises i) at least one organic species having at least one salt of a carboxylic acid group, ii) at least one organic species having at least two carboxylic acid groups, and iii) at least one organic species having at least one carboxylic acid group and a least one salt of a carboxylic acid group. Preferably the organic species having at least one salt of a carboxylic acid group is at the surface of the modified organic colorant.

The present invention further relates to an inkjet ink composition comprising a) a liquid vehicle and b) the modified organic colorant described herein. Preferably the liquid vehicle is an aqueous vehicle, and the resulting inkjet ink composition is an aqueous inkjet ink composition.

DETAILED DESCRIPTION OF THE INVENTION

Figure 1:
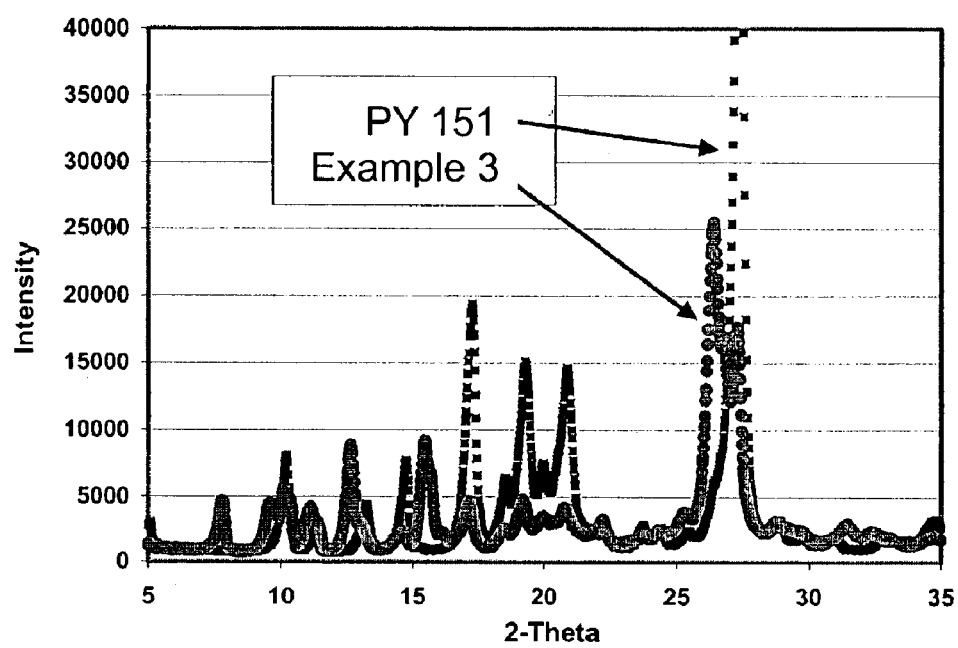
FIG. 1 shows x-ray powder diffraction patterns for a modified organic colorant of the present invention and for the organic colorant from which it was prepared.

The present invention relates to methods of preparing modified organic colorant dispersions. Modified organic colorants, in dispersion and dry form, and their uses are also disclosed.

In one embodiment, the method of the present invention comprises the step of combining an organic colorant comprising at least one organic species having at least one carboxylic acid group, an hydroxide reagent, and an aqueous medium to form a modified organic colorant dispersion, and a particle size reduction step. Each of these components will be described in more detail below. The steps can occur in any order but preferably the step of combining the components is followed by the particle size reduction step. The organic colorant, hydroxide reagent, and aqueous medium can be combined in any order. However, it is preferred that either the organic colorant or hydroxide reagent be combined with the aqueous medium prior to the addition of the other component. Thus, the organic colorant may be added to the hydroxide reagent, which has already been combined with the aqueous medium, or, alternatively, the hydroxide reagent may be added to the organic colorant, which has already been combined with the aqueous medium. In addition, it may be desirable to combine the organic colorant and hydroxide reagents together after both have been combined with the aqueous medium.

The step of combining the components may take place in any suitable vessel, and the components may be added to the vessel either in several increments, in one single increment, or continuously. In a preferred embodiment of the method of the present invention, the organic colorant, hydroxide reagent, and aqueous medium are combined in equipment capable of providing high shear mixing conditions. Such equipment is known in the art and includes, for example, equipment capable of providing a grinding, impact, or similar impingement action, such as horizontal media mills, vertical media mills such as attritors, ball mills, hammer mills, pin disk mills, fluid energy mills, jet mills, fluid jet mills, impingement jet mills, rotor-stators, pelletizers, homogenizers, sonicators, cavitators, and the like. Thus, for the purposes of this preferred embodiment, "high shear mixing conditions," when referring to the step of combining the components, means mixing conditions having sufficient energy to produce an intimate mixture of the components. High shear mixing is particularly preferred when one of the components is insoluble in the aqueous medium, such as when the organic colorant is a colored pigment. The high shear mixers may be either batch, semi-continuous, or continuous mixers. A continuous mixer offers both economic and practical advantages to batch processing equipment and would be generally preferred.

The step of combining the components can occur at any temperature and for any time sufficient to produce a modified organic colorant dispersion. The temperature and time will depend on a variety of factors, including, for example, the type of organic colorant, the relative amounts of each component, and their concentrations. Typically, the components are combined at a temperature ranging from about 0° C. and 90° C. Preferably the temperature is from about 0° C. and 70° C., and most preferably from about 11° C. and 50° C. The temperature may be controlled by any method known in the art. In addition, when high shear mixing conditions are used, the temperature may be produced and/or maintained by the shearing. The time period is typically between 5 minutes and 48 hours, and is preferably between 30 minutes and 24 hours, most preferably between 1 hour and 12 hours.

As described above, the method of the present invention comprises a step of combining components and a particle size reduction step, and these steps can occur in either order. Thus, in one embodiment, the method of the present invention comprises the step of reducing the particle size of an organic colorant and then combining this size-reduced organic colorant with the components described herein. A further size reduction step may also be employed. In another embodiment, the method of the present invention comprises the steps of combining the components described herein to form a modified organic colorant in dispersion, and then subjecting the dispersion to a particle size reduction step, whereby the modified organic colorant is size-reduced. Therefore, the dispersion subjected to particle size reduction comprises at least one insoluble or only slightly soluble component. This may be, for example, the organic colorant used in the method or the modified organic colorant produced by the method. Other possibilities also exist and will be known to one skilled in the art.

The step of reducing the particle size may occur either in a separate vessel as the step of combining the components or alternatively may occur in the same vessel. As stated previously, this step preferably follows the step of combining the components. In addition, these two steps may occur simultaneously. Any equipment known in the art for reducing particle size may be used here, including the high shear mixing equipment described above. A particularly preferred technique for reducing particle size is sonication.

The particle size of the organic colorant or the modified organic colorant prior to the particle size reduction step is not generally limiting but is typically approximately 500 nm. After the step of particle size reduction, the modified organic colorant dispersion will have a resulting particle size allowing it to be stable in the dispersion medium. Typically, the particle size of the colorant will be less than or equal to 500 nm. Preferably, the particle size will be less than or equal to 400 nm, more preferably less than or equal to 300, and most preferably less than or equal to 200 nm.

The method may further comprise a drying step. Any equipment known to one skilled in the art useful for drying colorant dispersions can also be used here. This results in a modified organic colorant in a dry form, such as a powder, pellet, granule, or cake.

The organic colorant used in the method of the present invention may be any colorant known to one skilled in the art. As discussed above, it is preferred that the organic colorant be insoluble in the aqueous medium. Thus, preferably the organic colorant is either a colored pigment or a disperse dye (which is soluble in a solvent but is water insoluble). Most preferred are colored pigments. Since the organic colorant used in the method of the present invention is an organic material which comprises at least one organic species having specified functional groups, pigments such as titanium dioxide and silica (which are inorganic colorants) as well as carbon black and other carbonaceous materials (which, like inorganic colorants, are not comprised of organic species as defined herein), are not typically suitable as the organic colorant for the present invention.

The organic colorant may be chosen from a wide range of conventional colored pigments or disperse dyes. The organic colorant can comprise a blue, black, brown, cyan, green, white, violet, magenta, red, orange, or yellow pigment, or mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio) indigoids. Such pigments are commercially available in either powder or press cake form from a number of sources including, BASF Corporation, Engelhard Corporation and Sun Chemical Corporation. Examples of suitable organic colorants are described in the Colour Index, 3rd edition (The Society of Dyers and Colourists, 1982). A preferred colored pigment is Pigment Yellow 151, as is described in more detail below.

The colored pigment or disperse dye used as the organic colorant can have a wide range of BET surface areas, as measured by nitrogen adsorption, and therefore, a wide range of particle sizes. It is preferred that such an organic colorant have a small particle size in order to prepare modified organic colorant dispersions having desirable overall properties, such as stability. If the preferred smaller particle size (and therefore higher surface area) organic colorant is not readily available, the organic colorant may be subjected to size comminution or reduction techniques to reduce the starting particle size of the colorant. For example, in a preliminary step, the organic colorant may be subjected to high shear mixing conditions, if necessary or desirable, prior to the step of combining the components. For this preliminary step, "high shear" refers to conditions sufficient to reduce the particle size of the organic colorant in the aqueous medium. Equipment described above for the step of combining the components may also be used in this preliminary step.

It is known in the art that insoluble organic colorants, such as colored pigments and disperse dyes, consist of insoluble organic species (often referred to as dye molecules) having defined chemical structures. The organic species often comprise a variety of functional groups. The chemical structure of the organic species and location of functional groups determines the color of the organic species as well as the pigment's or dye's chemical reactivity.

The organic colorant used in the method of the present invention comprises at least one organic species having at least one carboxylic acid group. An example of this type of organic colorant is Pigment Yellow 151. In addition, the carboxylic acid group may result from the hydrolysis of an organic colorant comprising at least one organic species having at least one ester group. Examples of ester group containing organic colorants include Pigment Yellow 120, Pigment Yellow 155, Pigment Yellow 175, Pigment Yellow 213, Pigment Red 220, and Pigment Red 221. The carboxylic acid group may be anywhere in the chemical structure of the organic species. The organic species may further comprise a variety of additional functional groups, such as, for example, azo groups, amide groups, nitro groups, and the like.

The carboxylic acid group of the organic species may be any group having the general formula R—COOH. R can be an aryl or alkyl group. Thus, the carboxylic acid group can be an alkanoic acid group or an aromatic acid group, such as a benzoic acid group.

An hydroxide reagent is also combined in the method of the present invention. An hydroxide reagent is any reagent that comprises an $OH^-$ ion, such as a salt having an hydroxide counterion. Examples include sodium hydroxide, potassium hydroxide, lithium hydroxide, and ammonium hydroxide. Other hydroxide salts, as well as mixtures of hydroxide reagents, can also be used. Furthermore, other alkaline reagents may also be used which generate $OH^-$ ions in an aqueous medium. Examples include carbonates such as sodium carbonate, bicarbonates such as sodium bicarbonate, and alkoxides such as sodium methoxide and sodium ethoxide.

The aqueous medium used in the method of the present invention can be any medium containing water. Thus, the aqueous medium can be, for example, water or mixtures of water with water miscible solvents such as alcohols. Preferably the aqueous vehicle is water. Other additives may also be present, such as for example, surfactants, stabilizers, phase transfer catalysts, and the like.

The amounts of each component may be varied in order to obtain a modified organic colorant dispersion. The amounts will depend on a variety of factors, including the type of organic colorant and the number of carboxylic acid groups of the organic species. Typically, the ratio of organic colorant to aqueous medium is about 1:1 and 1:100. Preferably the ratio is about 1:1 to 1:50, more preferably 1:2 to 1:20, and most preferably 1:2 to 1:10.

The amount of hydroxide reagent can be calculated based on the total molar amount of carboxylic acid groups, which is determined from the total weight of organic colorant used, the molecular weight of the organic species which comprises the organic colorant, and the number of carboxylic acid groups per organic species. Any amount of hydroxide can be used, depending on the desired level of carboxylic acid salt groups to be attained. Preferably the amount of hydroxide is between about 5% and 200% based on the total molar amount of carboxylic acid groups, more preferably between about 5% and 100%, and most preferably between about 5% and 20% based on the total moles of carboxylic acid groups.

The present invention further relates to a modified organic colorant comprising specific types of organic species. As used herein, the term "modified" refers to a chemical transformation or reaction of the organic colorant. Thus, the modified organic colorant of the present invention comprises the reaction product of an organic colorant and an hydroxide reagent. The organic colorant comprises at least one organic species having at least one carboxylic acid group. The modified organic colorant may comprise at least one organic species having at least one salt of a carboxylic acid group and may further comprise at least one organic species having at least one carboxylic acid group. The organic colorants can be any of those described above, and is preferably a colored pigment. The carboxylic acid group and hydroxide reagents can also be any of those described above. The salt of a carboxylic acid group can be any group having the general formula —$COO^-M^+$, resulting from the reaction of any of the carboxylic acid groups described above and a base having a metal counterion ($M^+$). Examples of counterions include those described for the hydroxide reagent above.

In a first embodiment, the modified organic colorant of the present invention comprises the reaction product of an organic colorant comprising at least one organic species having one carboxylic acid group and an hydroxide reagent. For this first embodiment, the modified organic colorant comprises at least one organic species having one salt of a carboxylic acid group. The modified organic colorant may further comprise at least one organic species having one carboxylic acid group.

The composition of the modified organic colorant of this first embodiment can be described as follows. If the amount of the organic species having one carboxylic acid group of the organic colorant is represented by Z, and, for the modified organic colorant, the amount of the organic species having one carboxylic acid group is represented by Y and the amount of organic species having one salt of a carboxylic acid group is represented by X, then the composition of the modified organic colorant of the present invention will satisfy the relationship: $X+Y=Z$.

The amount of each organic species can be varied to produce modified organic colorants having improved overall properties. For example, using the designations described above, X (the amount of organic species of the modified organic colorant having one carboxylic acid salt group) can be equal to Z (the amount of organic species having at least one carboxylic acid group of the organic colorant).

Preferably, X is a value less than Z. For example, X may be less than 50% of Z, more preferably less than 10% of Z, and most preferably less than 2% of Z. Furthermore, it is preferred that X be less than Y. Thus, the modified organic colorants of the first embodiment of the present invention preferably comprise more organic species having one carboxylic acid group than organic species having one salt of a carboxylic acid group. It is most preferred, in order to form a stable dispersion of this modified organic colorant, that the organic species having one salt of a carboxylic acid group be at or near the surface of the modified organic colorant.

In a second embodiment, the modified organic colorant of the present invention comprises the reaction product of an organic colorant comprising at least one organic species having at least two carboxylic acid groups, and an hydroxide reagent. For this embodiment, the modified organic colorant comprises i) at least one organic species having at least one salt of a carboxylic acid group, ii) at least one organic species having at least two carboxylic acid groups, and iii) at least one organic species having at least one carboxylic acid group and a least one salt of a carboxylic acid group. The organic colorant, hydroxide reagent, and groups are as described above.

The composition of the modified organic colorant of this second preferred embodiment can be defined in a similar way as for the first preferred embodiment. Thus, for the organic colorant, if the amount of the organic species having at least two carboxylic acid groups is represented by Z and, for the modified organic colorant, the amount of the organic species having at least two carboxylic acid groups is represented by Y, the amount of organic species having at least one salt of a carboxylic acid group is represented by X, and the amount of organic species having at least one carboxylic acid group and at least one salt of a carboxylic acid group is represented by A, then the modified organic colorant of the present invention will satisfy the relationship: $X+Y+A=Z$.

As for the first embodiment, the amount of each organic species can be varied to produce modified organic colorants having improved overall properties. For example, using the designations described above, X+A (the amount of organic species of the modified organic colorant having carboxylic acid salt groups) can be equal to Z (the amount of organic species of the organic colorant having at least two carboxylic acid groups). Preferably, the value of (X+A) is less than Z. For example, (X+A) may be less than 50% of Z, more preferably less than 10% of Z, and most preferably less than 2% of Z. Furthermore, it is preferred that (X+A) be less than Y. Thus, the modified organic colorant of the second embodiment of the present invention preferably comprises more organic species having carboxylic acid groups than organic species having carboxylic acid salt groups. It is most preferred, in order to form a stable dispersion of this modified organic colorant, that the organic species having carboxylic acid salt groups be at or near the surface of the modified organic colorant.

For both embodiments, the modified organic colorants can be prepared by any method known in the art. In particular, the modified organic colorants of the present invention can be prepared using the method of the present invention as described above. Thus, when the method of the present invention is used, the relationship between the amounts of organic species having salts of carboxylic acid groups in the modified organic colorant and the organic species of the organic colorant can be viewed as a percent conversion. For example, for the first embodiment, $X=Z$ would be interpreted as 100% conversion, X is less than 50% of Z would mean less than 50% conversion, and so on.

Likewise for the second embodiment, in which $(X+A)=Z$ would be 100% conversion (i.e., 100% of the organic species having at least two carboxylic acid groups have been converted to an organic species having at least one salt of a carboxylic acid group), (X+A) is less than 50% of Z would be less than 50% conversion, etc. The amounts of each organic species can be varied, for example, by varying the amount of hydroxide reagent, the reaction concentration, the type of organic colorant, and the reaction conditions (including reaction time, temperature, and, if used, amount of shear).

Utilizing the method of the present invention, the modified organic colorant will be in dispersion form. As stated earlier, the dispersion may be subjected to drying to form a modified organic colorant. The modified organic colorants of the present invention, as well as the dispersions prepared by the method of the present invention, may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art.

The modified organic colorants and dispersions may also be purified or classified to remove impurities and other undesirable free species which can co-exist in the dispersion as a result of the manufacturing process. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, and $Mg^{2+}$.

The modified organic colorants and dispersions of the present invention may be useful in a variety of applications, including, but not limited to inks, coatings, plastics, paper, textiles, and rubber products. In particular, the modified organic colorant dispersions have been found to be effective in inkjet ink compositions. Therefore, the present invention also relates to an inkjet ink composition comprising a) a liquid vehicle, b) a modified organic colorant.

In general, an inkjet ink composition consists of a vehicle, which functions as a carrier, and a colorant such as a dye or pigment. Additives and/or cosolvents can be incorporated in order to adjust the ink to attain the desired performance. Preferably, the liquid vehicle for the inkjet ink compositions of the present invention is an aqueous vehicle, and the inkjet ink composition is therefore an aqueous inkjet ink composition. The aqueous vehicle can be the same as described above in relation to the method of preparing the modified organic colorant dispersion.

The modified organic colorant used in the inkjet ink compositions of the present invention are the same as described above and are present in an amount effective to provide the desired image quality (for example, optical density) without detrimentally affecting the performance of the inkjet ink. For example, typically the modified organic colorant will be present in an amount ranging from about 0.1% to about 20% based on the weight of the ink. Mixtures of colorants may also be used. In addition, it is also within the bounds of the present invention to use a formulation containing a modified pigment product as described in, for example, U.S. Pat. Nos. 5,630,868, 5,803,959, 5,837,045, and 5,922,118, all incorporated in their entirety by reference.

The inkjet ink compositions of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40%.

Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink compositions can be purified and/or classified using methods such as those described above for the colored pigment dispersions described above. In this way, unwanted impurities or undesirable large particles can be removed to produce an inkjet ink with good overall properties.

The modified organic colorants of the present invention have also been found to form crystals which differ significantly from those of the corresponding organic colorants comprising at least one organic species having carboxylic acid groups. For example, x-ray crystallography shows that the crystal structure of the modified organic pigments of the present invention is more open than those of the corresponding acid-containing pigments. Therefore, the modified organic colorants may also be used in applications in which the development of this open crystal structure can be utilized. Examples include applications utilizing solid state pH buffers in which insoluble materials are used to control or maintain the pH of aqueous systems. In addition, since the ion in the open crystal can be readily replaced, these materials may be used in applications in which the delivery of a specific ion is required. Examples include ion storage devices, such as batteries and electrodes, and drug delivery systems.

The present invention will be further clarified by the following examples which are intended to be only exemplary in nature.

EXAMPLES

Example 1

To a 250 mL beaker was added 95 grams of a 0.1 N NaOH solution followed by 5 g of Pigment Yellow 151 (Hostaperm Yellow 4G, available from Clariant Corporation). The mixture was then sonicated using a Sonicator® 3000 (available from Misonic Incorporated) for 30 minutes. The resulting product was a modified yellow colorant dispersion with a pH of 10 and a mean volume particle diameter of 349 nm (determined by UPA 150, from Microtrac).

This example shows an embodiment of the method of the present invention in which both the step of combining the components and the particle size reduction step are done simultaneously under high shear conditions, and sonication is used.

Example 2

The modified yellow colorant dispersion of Example 1 was sonicated for an additional 60 minutes. The mean volume particle size was found to be 260 nm. This dispersion was purified by ultra-filtration membrane (available from Spectrum Lab Inc, with 0.05 µm rating) until the permeate conductivity dropped to 30 µs/cm. The mean particle size was found to be 260 nm and the sodium level was determined by combustion analysis to be 4.2% by weight.

The zeta potential of the dispersion was determined using a Zeta Plus (from Brookhaven Instrument Corp.). Results are shown in the Table 1 below:

TABLE 1

| In 1 mM HCl | In 1 mM KCl | In 1 mM KOH |
|---|---|---|
| −6 mV | −36 mV | −32 mV |

The results show that the modified yellow colorant dispersion has a negatively charged surface, consistent with the sodium analysis. Furthermore, the surface tension of the above dispersion was also measured (using a Kruss Digital Tensiomert K-10 from Kruss USA) and found to be 71 dynes/cm, which indicates that the stability of this yellow dispersion does not result from the presence of surfactants or other surface-active agents.

Example 3

The modified yellow colorant dispersion of Example 2 was sonicated for an additional 90 minutes and centrifuged at 5000 rpm for 1 hr (using a Beckaman L-80 Ultracentrifuge and a Type-19 rotor). The physical properties of the resulting yellow dispersion are listed in Table 2 below:

TABLE 2

| pH | 10 |
|---|---|
| Surface Tension | 67 dynes/cm |
| Viscosity | 1.98 cP |
| Mean Volume Particle Size | 141 nm |
| Mean Volume Particle Size after 5 Weeks Storage at 70° C. | 149 nm |
| Sodium level (% by weight) | 4.4% |

As shown in Table 2, the resulting modified yellow colorant dispersion was colloidally stable even after 5 weeks storage at elevated temperature.

Examples 4A and 4B

The procedure described in Example 1 was followed, with the exception that Pigment Yellow 151 from Sun-Chemical Corporation (Symuler Fast Yellow Go) was used. For Example 4A, the pigment was in powder form, and for Example 4B, the pigment was in the form of a presscake. Table 3 summarizes the properties of the resulting modified yellow colorant dispersions:

TABLE 3

| Example | pH | Mean Volume Particle Size |
|---|---|---|
| 4A | 10.25 | 444 nm |
| 4B | 10.4 | 449 nm |

Examples 5A–5D

The procedure described in Example 1 was followed, with the exception that the 0.1 M NaOH solution was replaced with a 0.1 M LiOH solution (for Example 5A), a 0.1 M KOH solution (for Example 5B), a 0.1 M (Me)$_4$NOH solution (for Example 5C), or a 0.1 M ammonium hydroxide solution (for Example 5D). In each case, a stable yellow dispersion was obtained. Table 4 summarizes the properties of the resulting modified yellow colorant dispersions:

TABLE 4

| Example | Hydroxide Reagent | pH | Mean Volume Particle Size |
| --- | --- | --- | --- |
| 5A | LiOH | 10.2 | 447 |
| 5B | KOH | 10.1 | 410 |
| 5C | (Me)$_4$NOH | 10.1 | 450 |
| 5D | ammonium hydroxide | 10.8 | 390 |

These examples show that different types of hydroxide reagents can be used in the method of the present invention to produce a modified organic colorant comprising at least one organic species having attached at least one salt of a carboxylic acid group. The salt would correspond to the counterion of the hydroxide reagent.

Examples 6A and 6B

The procedure described in Example 1 was followed, with the exception that the Pigment Yellow 151 was pre-washed with a solvent (5 grams of pigment to 95 grams of solvent). For Example 6A, the solvent was acetone and for Example 6B, the solvent was isopropyl alcohol (IPA). Table 5 summarizes the properties of the resulting modified yellow colorant dispersions:

TABLE 5

| Example | pH | Mean Volume Particle Size |
| --- | --- | --- |
| 6A | 10.1 | 362 nm |
| 6B | 10.4 | 486 nm |

Comparative Examples 1 and 2

The procedure described in Example 1 was followed, with the exception that the 95 grams of 0.1 M NaOH solution was replaced with 95 grams of DI water (for Comparative Example 1) or 95 grams of 0.1 N HCl (for Comparative Example 2). With no hydroxide reagent, no modified yellow colorant dispersion resulted. Instead, only an unstable suspension formed, which settled within 1 hour at room temperature.

Example 7

The modified yellow colorant dispersion of Example 3 was dried, and its x-ray powder diffraction pattern, shown in FIG. 1 (on a GeigerflexD/MaxB from Rigaku/MSC using Cu target, λ=1.54 angstrom), was examined. As shown, compared to Pigment Yellow 151, the modified colored pigment showed an increased crystal spacing, consistent with the insertion of Na$^+$ ions into the crystals.

Figure 2:
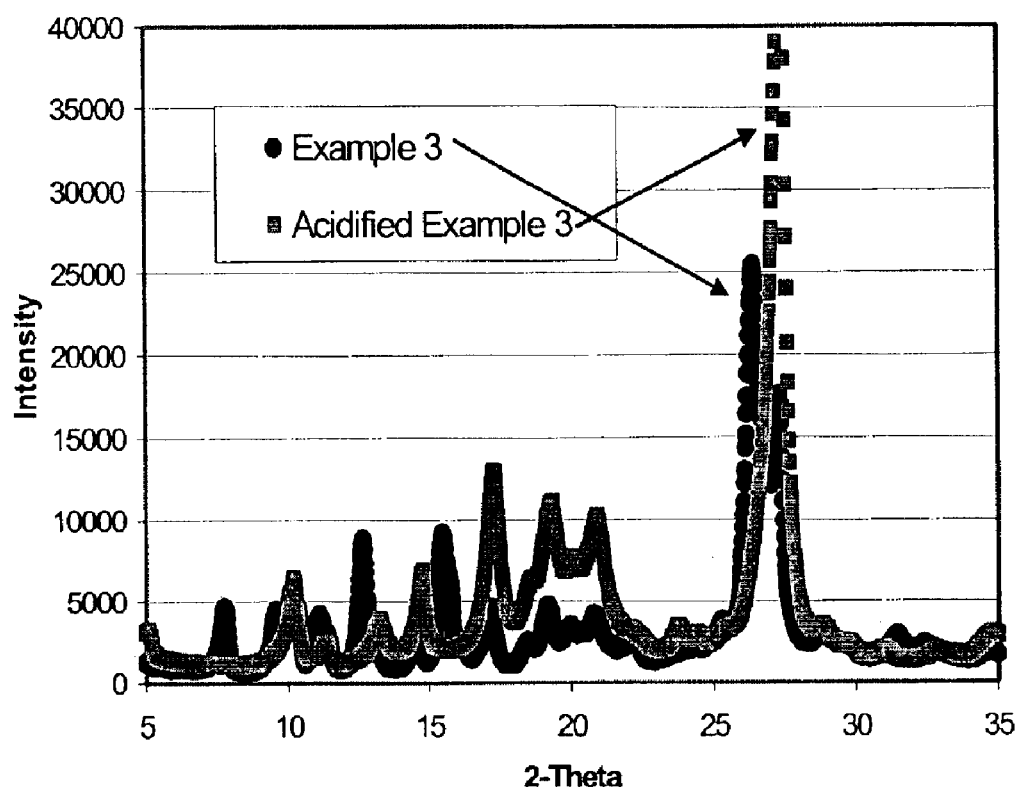
FIG. 2 shows x-ray powder diffraction patterns for a modified organic colorant of the present invention both prior to and after acidification.

The dispersion of Example 3 was acidified and washed with DI water, and the resulting X-ray powder diffraction pattern is shown in FIG. 2. As can be seen the pattern is the same as that of Pigment Yellow 151 from which the modified yellow colorant was prepared. The results demonstrate that the insertion of sodium ions is reversible and indicates that the modified colorant may be useful as either a solid state buffer or in ion storage and delivery devices.

Example 8

Figure 3:
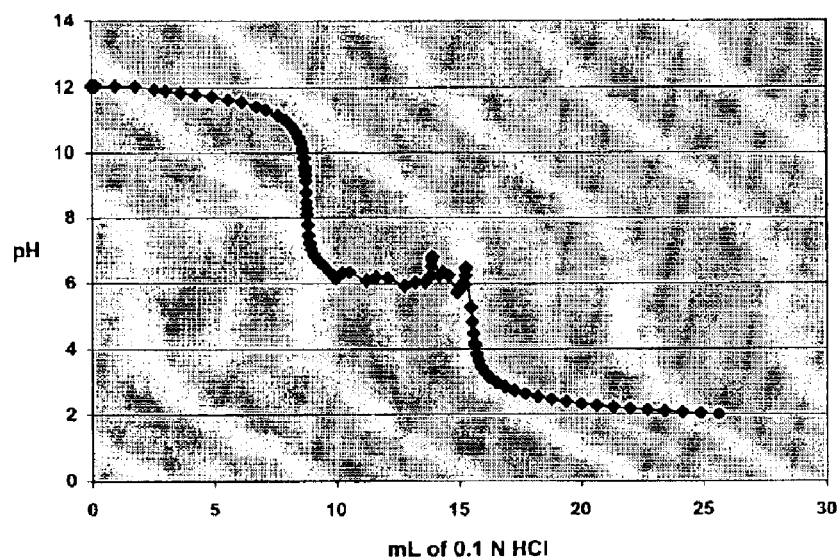
FIG. 3 shows a plot of the titration results for a modified organic colorant of the present invention as an indicator of modification level.

The amount of modification in the modified yellow colorant dispersion of Example 3 was studied by titration using an auto titrator from Metrohm Ltd. The pH of the modified yellow dispersion was first adjusted to 12 using 1M NaOH and then titrated with 0.1 N HCl. The titration curve is shown in FIG. 3. The total amount of titratable carboxylic acid groups can be calculated based on the amount of titrant used. Thus, the total amount of titratable groups of the modified organic colorant was determined to be 2.4 mmol/g with an effective pKa of about 6.2, as indicated by the plateau region of FIG. 3. The total carboxylic acid group content of the organic colorant (Pigment Yellow 151, MW=381) was determined to be 2.6 mmol/g. Therefore, these results indicate that over 90% of the organic species of the organic colorant having one carboxylic acid group was converted to organic species having one salt of a carboxylic acid group.

This is supported by the corresponding sodium analysis results. The sodium level of the modified yellow colorant of the dispersion in Example 3 was measured by combustion and was found to be 1.9 mmol/g sodium. While this level is slightly less than the value determined by the titration method, the difference between can be attributed to the fact that during titration the pH was pre-adjusted to 12 before titration, which may produce more acid salt groups. Therefore, based on sodium analysis, the percent conversion would be approximately 70–75%.

This shows an embodiment of the present invention in which the modified organic pigment comprises a very high percentage of the organic species having one salt of a carboxylic acid group. Furthermore, it was determined that the dispersion of Example 3 could be ultra-filtered using a 0.05 μm membrane and no water-soluble dye was observed in the permeate. Therefore, the resulting modified organic colorant was found to be a pigment rather than a dye.

Example 9

The procedure described in Example 1 was followed, with the exception that 1 mN of NaOH was used instead of 0.1 N of NaOH. The resulting modified organic colorant dispersion was further processed according to the procedure described in Example 3. The resulting final dispersion was found to have a mean volume particle size of 150 nm and was stable after 5 weeks of storage at 70° C. Total titration groups was determined to be 0.4 mmol/g using a method similar to that shown in Example 8, with the exception that the pH of the dispersion was not pre-adjusted to 12 before titration. This corresponds to a percent conversion of organic species having at least one carboxylic acid group to organic species having at least one salt of a carboxylic acid group of approximately 15%.

These results show that amount of organic species having attached at least one salt of a carboxylic acid group can be varied by changing the amount of hydroxide reagent used. The % conversions of this modified organic colorant was much lower than that of Example 3, and this example gives an indication of the wide range of levels that can be achieved.

Example 10

A yellow ink was formulated using 5 mL of the modified yellow colorant dispersion of Example 3 and 5 mL of an ink vehicle containing 37.6% of 2-pyrrolidone, 5.4% of pentane-1,5-diol, 6.0% of isopropanol, 0.1% of Surfynol®

465 and the balance of water. The ink was filtered through 450 nm syringe filter into Hewlett-Packard 2000C print head. Square patterns of yellow were printed using an HP 2000C printer on HP Bright White Inkjet paper and on HP Premium Plus Photo paper with excellent visual print quality and maximal optical density at 400 nm equal to 1.2–1.3.

As illustrated above, the methods of the present invention produce modified organic colorants and dispersions having improved overall properties. The colorants and dispersions may be particularly useful in inkjet ink compositions to prepare prints and images having excellent print quality and optical density.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of preparing a modified organic brunt dispersion comprising, the steps of:
    a) combining, in any order, i) an organic colorant comprising at least one organic species having at least one carboxylic acid group; ii) an hydroxide reagent; and iii) an aqueous medium, wherein the hydroxide reagent and organic colorant react to form a modified organic colorant dispersion; and
    b) reducing the particle size of the modified organic colorant in the dispersion to a particle size of less than or equal to 500 nm.

2. The method of claim 1, wherein the organic colorant is subjected to high shear mixing conditions prior to step a).

3. The method of claim 2, wherein the high shear mixing conditions occur in a horizontal media mill, vertical media mill, attritor, ball mill, hammer mill, pin disk mill, fluid energy mill, jet mill, fluid jet mill, impingement jet mill, rotor-stator, pelletizer, homogenizer, sonicator, or cavitator.

4. The method of claim 1, wherein the organic colorant, the hydroxide reagent, and the aqueous medium are combined under high shear conditions.

5. The method of claim 4, wherein the high shear mixing conditions occur in a horizontal media mill, vertical media mill, attritor, ball mill, hammer mill, pin disk mill, fluid energy mill, jet mill, fluid jet mill, impingement jet mill, rotor-stator, pelletizer, homogenizer, sonicator, or cavitator.

6. The method of claim 1, wherein steps a) and b) occur simultaneously.

7. The method of claim 1, wherein the particle size of the modified organic colorant is reduced by sonication.

8. The method of claim 1, wherein the organic colorant is a colored pigment.

9. The method of claim 8, wherein the colored pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

10. The method of claim 8, wherein the colored pigment is selected from the group consisting of: anthraquinones, phthalocyanine blues, phthalocyanine greens, diazos, monoazos, pyranthrones, perylenes, heterocyclic yellows, quinacridones, and (thio)indigoids.

11. The method of claim 1, wherein the hydroxide reagent is sodium hydroxide, potassium hydroxide, lithium hydroxide, ammonium hydroxide, or mixtures thereof.

12. The method of claim 1, wherein the aqueous medium is water.

13. The method of claim 1, wherein the particle size of the modified organic colorant in the dispersion is less than or equal to 400 nm.

14. The method of claim 1, wherein the particle size of the modified organic colorant in the dispersion is less than or equal to 200 nm.

15. The method of claim 1, further comprising the step of drying the modified organic colorant dispersion to form a modified organic colorant in dry form.

16. A modified organic colorant comprising the reaction product of a) an organic colorant comprising at least one organic species having at least one carboxylic acid group, and b) an hydroxide reagent, wherein the modified organic colorant has a particle size of less than or equal to 500 nm.

17. The modified organic colorant of claim 16, wherein the modified organic colorant comprises i) at least one organic species having at least one salt of a carboxylic acid group and ii) at least one organic species having at least one carboxylic acid group.

18. The modified organic colorant of claim 16, wherein the organic colorant comprises at least one organic species having one carboxylic acid group and wherein the modified organic colorant comprises at least one organic species having one salt of a carboxylic acid group.

19. The modified organic colorant of claim 18, wherein the modified organic colorant further comprises at least one organic species having one carboxylic acid group.

20. The modified organic colorant of claim 19, wherein:
    the organic species having at least one salt of a carboxylic acid group of the modified organic colorant is in an amount X;
    the organic species having at least one carboxylic acid group of the modified organic colorant is in an amount Y; and
    the organic species having at least one carboxylic acid group of the organic colorant is in an amount Z,
    and wherein X+Y=Z.

21. The modified organic colorant of claim 20, wherein X=Z.

22. The modified organic colorant of claim 20, wherein $X<(0.5)\times Z$.

23. The modified organic colorant of claim 20, wherein $X<(0.1)\times Z$.

24. The modified organic colorant of claim 20, wherein $X<(0.02)\times Z$.

25. The modified organic colorant of claim 20, wherein $X<Y$.

26. The modified organic colorant of claim 16, wherein the organic colorant comprises at least one organic species having at least two carboxylic acid groups and wherein the modified organic colorant comprises i) at least one organic species having at least one salt of a carboxylic acid group, ii) at least one organic species having at least two carboxylic acid groups, and iii) at least one organic species having at least one carboxylic acid group and a least one salt of a carboxylic acid group.

27. The modified organic colorant of claim 26, wherein:
    the organic species having at least one salt of a carboxylic acid group of the modified organic colorant is in an amount X;

the organic species having at least two carboxylic acid groups of the modified organic colorant is in an amount Y;

the organic species having at least one carboxylic acid group and at least one salt of a carboxylic acid group of the modified organic colorant is in an amount A; and the organic species having at least two carboxylic acid groups of the organic colorant is in an amount Z, and wherein X+Y+A=Z.

28. The modified organic colorant of claim 27, wherein (X+A)=Z.

29. The modified organic colorant of claim 27, wherein (X+A)<(0.5)×Z.

30. The modified organic colorant of claim 27, wherein (X+A)<(0.1)×Z.

31. The modified organic colorant of claim 27, wherein (X+A)<(0.02)×Z.

32. The modified organic colorant of claim 27, wherein X<Y.

33. The modified organic colorant of claim 17, wherein the organic species having at least one salt of a carboxylic acid group is at the surface of the modified organic colorant.

34. The modified organic colorant of claim 16, wherein the organic colorant is a colored pigment.

35. The modified organic colorant of claim 34, wherein the colored pigment comprises a blue pigment, a black pigment, a brown pigment, a cyan pigment, a green pigment, a white pigment, a violet pigment, a magenta pigment, a red pigment, an orange pigment, a yellow pigment, or mixtures thereof.

36. The modified organic colorant of claim 34, wherein the colored pigment is selected from the group consisting of: anthraquinones, phthalocyanine blues, phthalocyanine greens, diazos, monoazos, pyranthrones, perylenes, heterocyclic yellows, quinacridones, and (thio)indigoids.

37. The modified organic colorant of claim 16, wherein the modified organic colorant is in dispersion form.

38. The modified organic colorant of claim 16, wherein the modified organic colorant is a solid state pH buffer.

39. The modified organic colorant of claim 16, wherein the modified organic colorant is used in an ion storage device.

40. An inkjet ink composition comprising a liquid vehicle and a modified organic colorant comprising the reaction product of a) an organic colorant comprising at least one organic species having at least one carboxylic acid group and b) a hydroxide reagent.

41. The inkjet ink composition of claim 40, wherein the modified organic colorant comprises i) at least one organic species having at least one salt of a carboxylic acid group and ii) at least one organic species having at least one carboxylic acid group.

42. The inkjet ink composition of claim 40, wherein the organic colorant comprises at least one organic species having one carboxylic acid group and wherein the modified organic colorant comprises at least one organic species having one salt of a carboxylic acid group.

43. The inkjet ink composition of claim 42, wherein the modified organic colorant further comprises at least one organic species having one carboxylic acid group.

44. The inkjet ink composition of claim 40, wherein the organic colorant comprises at least one organic species having at least two carboxylic acid groups and wherein the modified organic colorant comprises i) at least one organic species having at least one salt of a carboxylic acid group, ii) at least one organic species having at least two carboxylic acid groups, and iii) at least one organic species having at least one carboxylic acid group and a least one salt of a carboxylic acid group.

45. The inkjet ink composition of claim 40, wherein the liquid vehicle is an aqueous vehicle.

* * * * *